Dec. 8, 1970  M. P. SCHRAG  3,545,180
DUST COLLECTOR AND FILTER THEREFOR
Filed Aug. 26, 1968  5 Sheets-Sheet 1

INVENTOR.
MAURICE P. SCHRAG
BY
Merchant & Gould
ATTORNEYS

Dec. 8, 1970     M. P. SCHRAG     3,545,180
DUST COLLECTOR AND FILTER THEREFOR
Filed Aug. 26, 1968     5 Sheets-Sheet 5
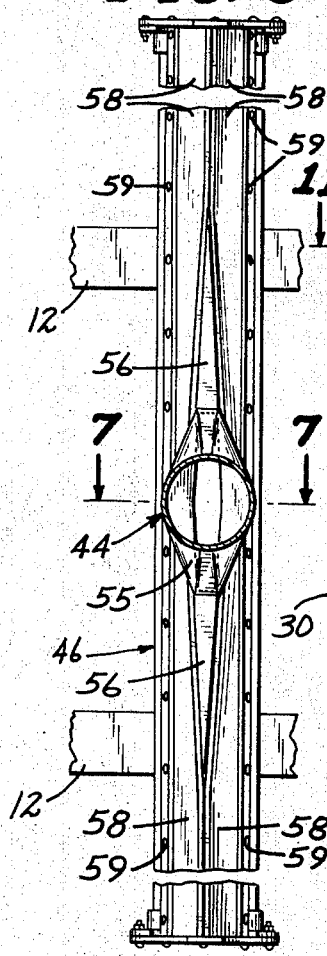
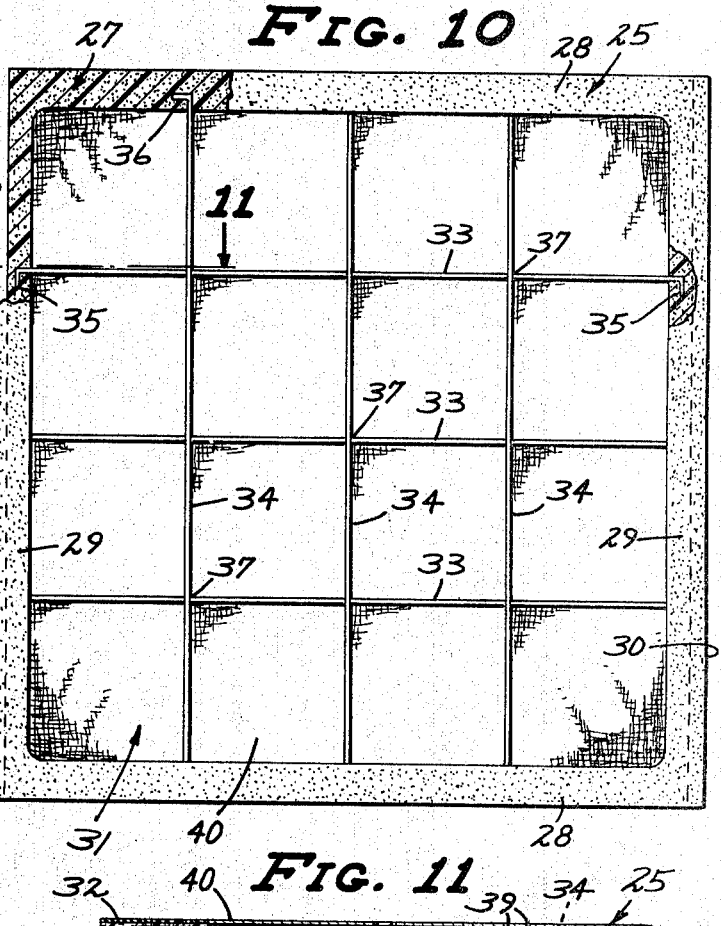
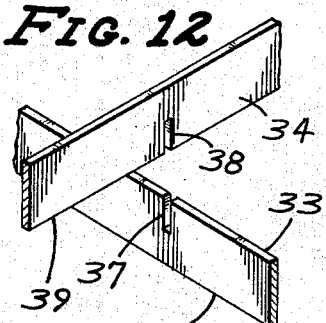
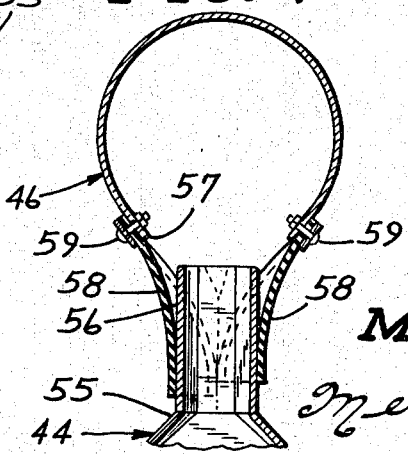
INVENTOR.
MAURICE P. SCHRAG
BY
Merchant & Gould
ATTORNEYS

United States Patent Office 3,545,180
Patented Dec. 8, 1970

3,545,180
DUST COLLECTOR AND FILTER THEREFOR
Maurice P. Schrag, Minneapolis, Minn., assignor to Carter-Day Company, Minneapolis, Minn., a corporation of Minnesota
Filed Aug. 26, 1968, Ser. No. 755,072
Int. Cl. B01d 46/12
U.S. Cl. 55—284
3 Claims

ABSTRACT OF THE DISCLOSURE

An air filter including a frame defining an opening and a generally vertical mounting surface surrounding the opening, and a vertically disposed flexible porous screen covering the opening and having a marginal edge secured to said mounting surface. The screen is disposed in a substantially neutral state without sagging under its own weight in its vertical position, but is adapted to be stretched and deflected to a predetermined degree by pressure of air moving through said opening. A filter cleaner includes a suction head movable parallel to the plane of the screen and operative to deflect adjacent portions of the screen away from the neutral condition thereof responsive to negative air pressure in the suction head.

---

An important object of this invention is the provision of a filter element which is highly efficient in operation and which can be quickly and easily cleaned by a reverse flow of air therethrough.

Another object of this invention is the provision of a filter element that can be produced at relatively low cost, and which is light in weight so as to be easily handled, while being of strong rigid construction.

Still another object of this invention is the provision of efficient means for cleaning the filter of foreign filtered out matter during the operation of the filter, without materially interfering with the filtering process.

To the above ends, I provide a plurality of filter elements each comprising a generally rectangular frame defining an opening for passage of air generally horizontally therethrough, and a vertically disposed flexible screen covering the opening and having a marginal edge portion at least partially embedded in a vertically disposed mounting surface of the frame surrounding the opening, to dispose the screen substantially in the plane of the mounting surface. Each screen is mounted in its respective frame in a substantially neutral unstretched condition, being only sufficiently taut to be substantially flat and to prevent sagging of the screen material under its own weight when in a vertical position. The filter frames are preferably of molded expanded synthetic plastic material, and are disposed in edge-to-edge relationship to position the screens in a common plane, whereby to provide one wall of a plenum through which dust laden air travels. A suction head, connected to a suction fan, defines an elongated slot-like inlet opening that extends across at least one of the screens in inwardly closely spaced parallel relationship to the screens, and is mounted in the plenum for reciprocatory movements parallel to the plane of the screens. Negative pressure in the suction induces a reverse flow of air through an adjacent portion of the screen adjacent the head to draw the adjacent screen portion into engagement with the suction head and remove matter collected on the screen. Means is provided for imparting reciprocatory movement to the suction head so that the head passes the filter elements in succession to continuously clean the screens during, and without materially interfering with, the filtering operation.

DESCRIPTION OF THE DRAWINGS

FIG. 6 is a fragmentary section taken on the line 6—6 of FIG. 4, on a reduced scale;

FIG. 7 is an enlarged horizontal section taken on the line 7—7 of FIG. 6;

FIG. 8, sheet 2 is a fragmentary view in inside elevation of one of the filter elements of this invention, some parts being broken away;

FIG. 9 is an enlarged fragmentary view in perspective of a corner portion of the filter element of FIG. 8;

FIG. 10 is an enlarged view in outside elevation of the filter element of FIG. 8, some parts being broken away and some parts being shown in section;

FIG. 11 is a further enlarged fragmentary section taken substantially on the line 11—11 of FIG. 10; and FIG. 12 is a fragmentary view in exploded perspective of a pair of partition elements of this invention.

DETAILED DESCRIPTION

Figure 1:
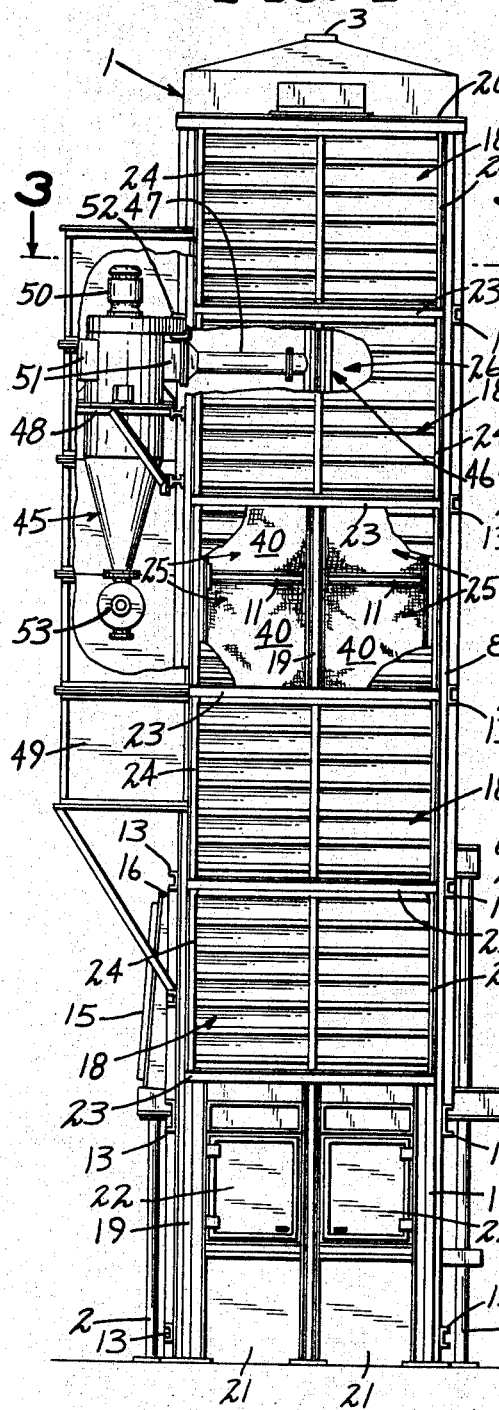
FIG. 1 is a view in front elevation of the dust collector and filter therefor of this invention, shown as being applied to a commercially available grain drying apparatus, some parts being broken away.
Figure 2:
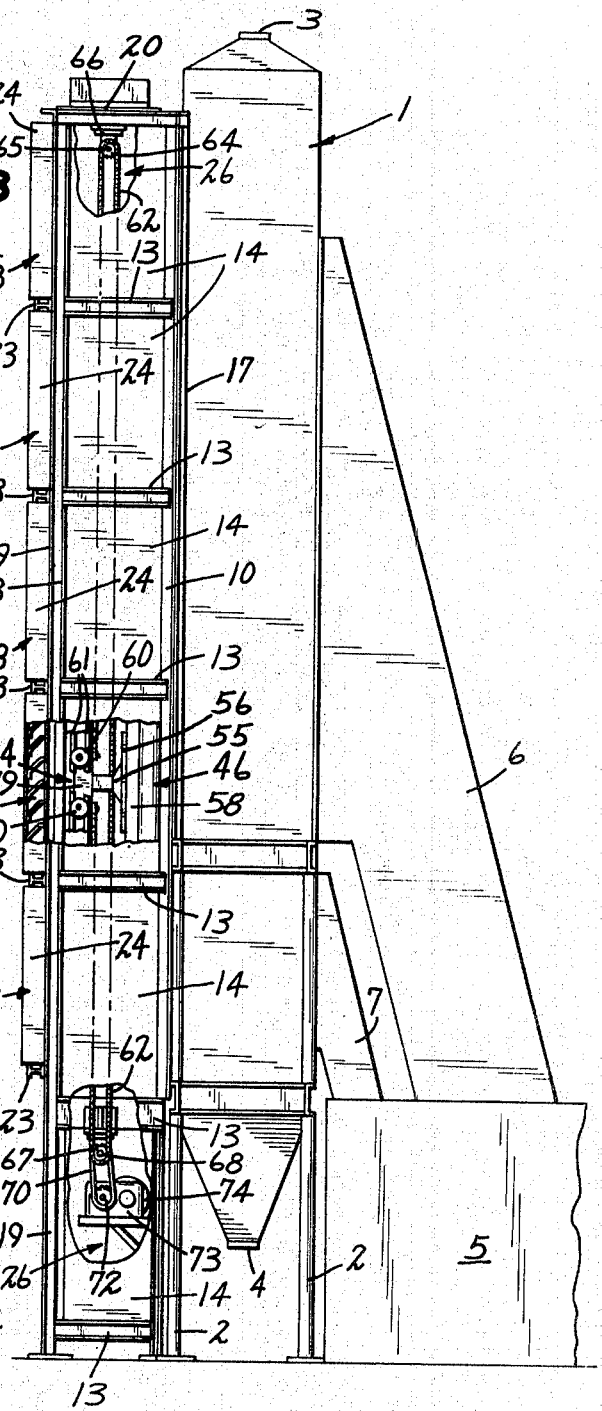
FIG. 2 is a view in side elevation, some parts being broken away and some parts being shown in section.

The embodiment of the invention illustrated is particularly adapted for use with conventional grain driers, a form of which is shown more or less diagrammatically in FIGS. 1 and 2 as comprising a tower-like housing 1 supported on legs 2 and having an inlet opening 3 at its upper end and a discharge hopper 4 at its lower end. Grain to be treated is fed into the housing 1 through the inlet opening 3 from whence the grain gravitates toward the discharge opening 4 in the usual manner. Heated air or gas is delivered under pressure from blower means, not shown, but contained within the casing 5, through ducts 6 and 7 to one side of the housing 1, the heated air or gas being forced through the grain within the housing 1 in a direction from the right to the left with respect to FIG. 2, from whence the air or gas is discharged outwardly from the opposite side of the housing 1. The grain drier, in and of itself, does not comprise the instant invention. Hence, for the sake of brevity, further detailed showing and description thereof is omitted.

Figure 3:
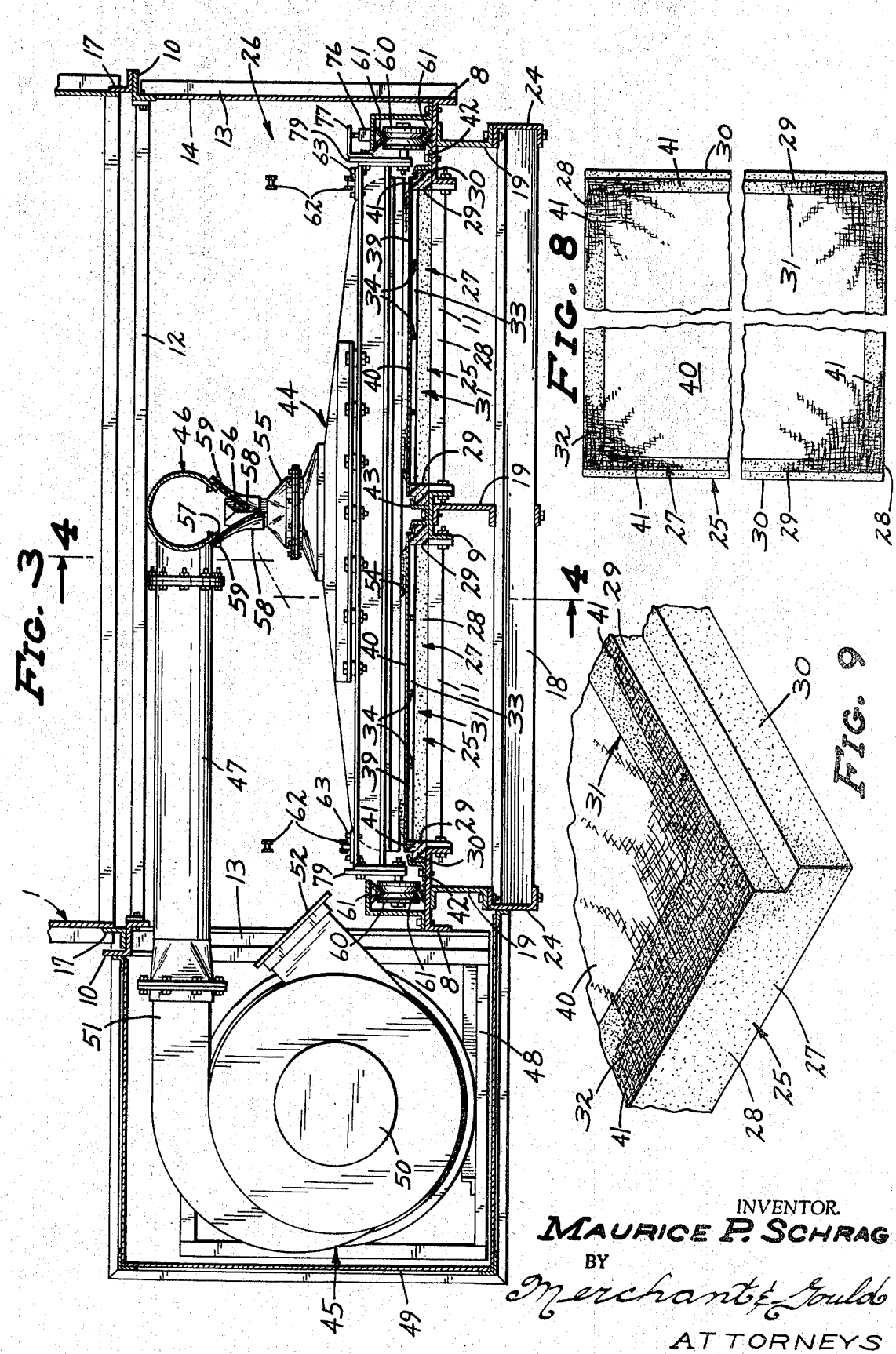
FIG. 3 is an enlarged horizontal section, taken substantially on the line 3—3 of FIG. 1.

In the embodiment of the invention illustrated, the supporting structure is shown as comprising a pair of laterally spaced vertically extended front channel beams 8, a vertically extended front intermediate channel beam 9, centrally disposed between the beams 8, laterally spaced vertical rear angle beams 10, vertically spaced front cross frame members 11 rigidly connected to the beams 8 and 9, vertically spaced rear cross frame members 12 connected at their opposite ends to the rear angle beams 10, and vertically spaced side frame members 13 connecting the front channel beams 8 to respective ones of the rear angle beams 10. The opposite sides of the supporting structure are closed by side panels 14, one of the side panels, indicated at 15 in FIG. 1, being hinged at its upper end, as at 16, to the frame structure and operating as a pressure relief damper or valve, as will hereinafter become apparent. As shown in FIG. 3, a pair of vertically extended angle members 17, secured to the angle beams 10, engage opposite sides of the grain dryer 1, whereby to operatively couple the dust collector of this invention to the air discharge side of the grain dryer. A plurality of louver sections 18 provide a substantially open front to the dust collector, and are supported from the channel beams 8 and 9 by vertically extended channel members 19. The upper end of the supporting structure is closed by a top wall 20, and the front of the supporting structure, below the lowermost louver section 18, is closed by panels 21, fitted with hinged access doors 22, see FIG. 1. Further, as shown particularly in FIGS. 1, 2 and 4, the louver sections 18 are supported by cross rails 23 and vertical channel members 24 bolted or otherwise rigidly secured to the supporting beams 19.

A plurality of rectangular filter elements 25 are disposed in a pair of vertically extended rows thereof inwardly of the louver section 18, the filter elements 25 cooperating with the side panels 14, top wall 20 and the adjacent side of the grain dryer 1 to define a vertically elongated plenum 26. Each of the filter elements 25 comprises a rectangular frame 27 having upper and lower horizontally disposed frame portions 28 and vertically disposed side frame portions 29, the side frame portions 29 being formed to provide laterally outwardly projecting flanges 30. Each of the frames 27 is of one-piece structure, being molded from synthetic plastic material, such as expanded polyurethane plastics. Each frame 27 defines a rectangular opening 31 for passage of air therethrough, and has an inner vertically disposed flat mounting face 32 surrounding the opening 31. The opening 31 is divided into air passages by a plurality of vertically spaced horizontal partition elements 33 and horizontally spaced vertical partition elements 34 having respective angularly displaced end portion 35 and 36 that are embedded in respective ones of the top and bottom frame portions 28 and side frame portions 29, see particularly FIGS. 10 and 11. The partition elements 33 and 34 are notched, as at 37 and 38 respectively, see FIG. 12, whereby the partition elements 33 and 34 are interconnected so as to be disposed in a common plane. Further, the partition elements 33 and 34 have inner edges 39 disposed in a common plane in closely spaced parallel relation to the plane of the mounting surface 32 of their respective frame 27. Each filter element 25 further includes a flexible porous screen 40 that covers the opening 31, the screen 40 having a marginal edge portion 41 that is at least partially embedded in the mounting surface 32 of its respective frame 27. Each screen 40 is preferably made from flexible porous material such as polyester screen cloth, and is disposed over its respective opening 31 in a substantially unstretched condition, but sufficiently taut to be disposed substantially flat and to prevent sagging of the screen under its own weight, when the screen is in a vertically disposed position. Each screen 40 is applied to the mounting surface 32 of its respective frame 27, during molding of the frame 27 so that the frame material flows into the interstices of the material at the marginal edge portion 41, whereby to dispose the screen 40 substantially in the plane of the mouning surface 32. The slight tension that is applied to the screen during the molding of the frame thereon, permits the screen 40 to be deflected from the normal plane thereof toward or away from the partition elements 33 and 34, responsive to pressure differential between the plenum 26 and the exterior of the dust collector. By way of example, the screen 40 is under such tension in its neutral state, that a stream of air flowing through a twelve inch square filter covered opening, at a pressure of .018 pound per square inch, or one-half inch water gage, will deflect or bow the screen outwardly to a maximum of substantially one-eighth of one inch from its neutral flat condition.

The several filter elements 25 in each row thereof, are stacked in edge-to-edge relationship, with the bottom portion 28 of each thereof resting on the top portion 28 of an underlying one of the filter elements 25. The frames 27 are sufficiently light in weight and of sufficient strength and rigidity that the lowermost one thereof in each row is fully capable of supporting all of the filter elements of its respective row thereof. As shown particularly in FIGS. 3–5, the filter frames 27 engage the inner surfaces of the front channel beams 8 and 9, and are held thereagainst by retaining clips 42 and 43 fastened to the channel beams 8 and 9 respectively and engaging the side flanges 30 of the frames 27.

During drying of grain in the dryer 1, the drying air flows laterally outwardly therefrom into the plenum 26, carrying with it dust, hull particles and small broken-off pieces from the grain. Some of the heavier particles fall downwardly in the plenum toward the bottom thereof to be removed by any suitable means, not shown, the lighter particles and dust being carried into engagement with the screens 40 where they are filtered out from the air flowing through the screens 40 and louver sections 18 to the exterior. In order to control the accumulation of dust and other foreign matter on the several filter elements 25, I provide suction cleaning means including a suction head 44, an air dust separator 45 of the cyclone type and conduit means including a vertically extended tube 46 within the plenum 26 and an air duct 47 connecting the tube 46 to the separator 45. The separator 45 is supported by a bracket 48 connected to adjacent ones of a pair of the side frame members 13, and is contained within a housing 49. The separator 45 includes the usual suction fan, not shown, but driven by a motor 50, and has an inlet 51 connected to one end of the duct 47, and an outlet 52 which discharges air into the plenum 26, see FIG. 3. With reference to FIG. 1, it will be seen that the air dust separator 45 includes the usual valving device 53 at its lower end for discharge of separated-out foreign particles.

Figure 4:
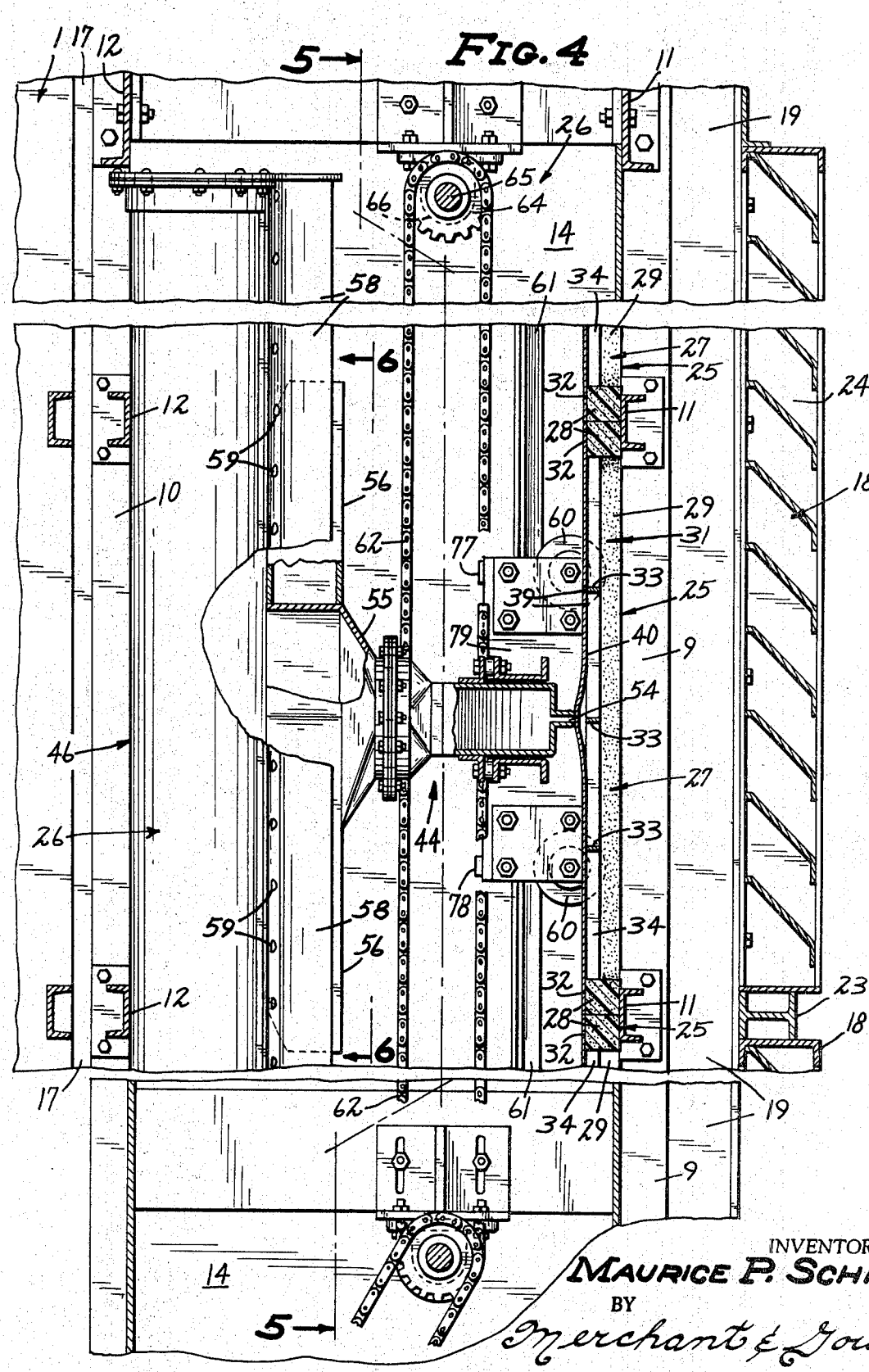
FIG. 4 is an enlarged fragmentary section taken on the line 4—4 of FIG. 3.
Figure 5:
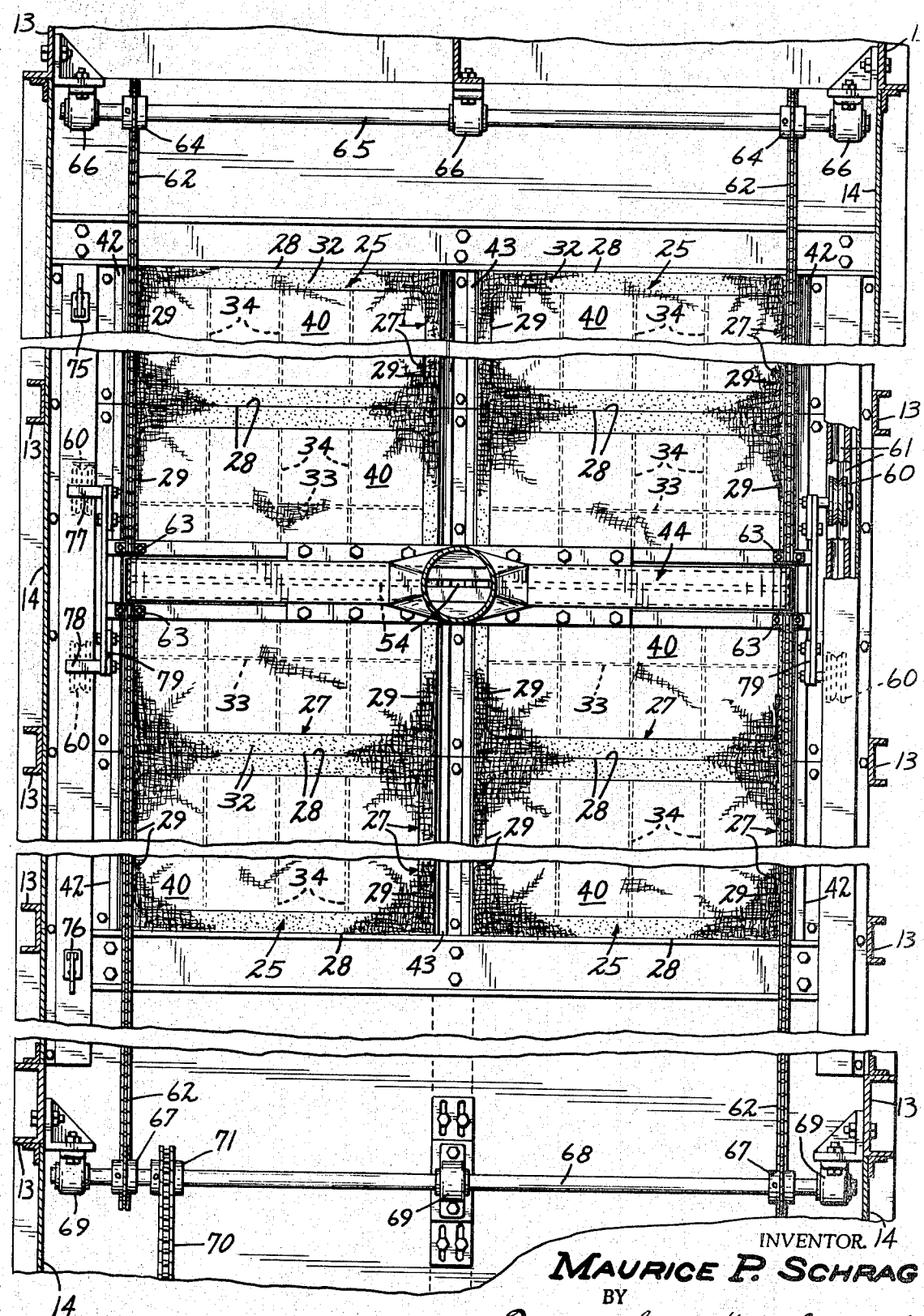
FIG. 5 is a vertical section taken substantially on the line 5—5 of FIG. 4.

The suction head 44 is horizontally elongated to extend across the two rows of filter elements 25, and is formed to provide an elongated slot-like mouth or air inlet passage 54 of predetermined cross-sectional area and disposed in closely inwardly spaced parallel relationship to the common plane of the filter screens 40, the inlet passage or opening 54 horizontally spanning both rows of filter elements 25, as shown in FIGS. 3 and 5. The suction head 44 is operatively connected at its rear central portion to the vertically extended tube 46 by a fitting 55 having a vertically elongated blade-like portion 56 that projects rearwardly toward a slot-like opening 57 in the tube 46, the opening 57 extending substantially the entire length of the tube 46. The tube 46 is of a length substantially equal to the height of the rows of filter elements 25. The opening 57 in the tube 46 is normally closed by a flexible closure comprising a pair of closure strips 58 of flexible resilient rubber-like material that are bolted or otherwise rigidly secured at their longitudinally inner edges to the tube 46 adjacent opposite sides of the slot or opening 57, as indicated at 59. The closure strips 58 converge forwardly from the tube 46, the front longitudinal edge portion of the strips 58 being pressed together in substantially face-to-face engagement. As shown particularly in FIGS. 3, 4, 6 and 7, the blade-like portion 56 of the fitting 55 is interposed between the closure strips 58 to force the strips apart for the vertical length of the portion 56, whereby to establish communication between the tube 46 and suction head 44.

At its laterally opposite ends, the suction head 44 is provided with pairs of vertically spaced rollers 60 that are mounted between pairs of cooperating guide rails 61 extending longitudinally of and operatively carried by the channel beams 8, to position the inlet opening 54 of the suction head in rearwardly spaced relation to the plane of the filter screens 40, and for guiding the suction head in a vertical path parallel to the filter screens 40. Means for raising and lowering the suction head 44 comprises a pair of laterally spaced link chains 62, having opposite ends rigidly secured to the suction head 44 adjacent its opposite ends, as indicated at 63. The chains 62 are entrained over a pair of upper sprockets 64 mounted on a shaft 65 journalled in bearings 66 adjacent the upper end of the supporting structure, and over a pair of lower sprocket wheels 67 mounted on a shaft 68 journalled in bearings 69 near the lower end of the supporting structure. An endless drive chain 70 is entrained over a sprocket wheel 71 keyed or otherwise rigidly secured to the shaft 68 and a second sprocket wheel 72 mounted on the output shaft of a conventional speed reducer 73 connected to a drive motor 74, see particularly FIG. 2. The motor 74 is of the reversing type, and operates to impart vertical reciprocatory movements to the suction head 44 between the lower and upper end portions of the plenum 26. A pair of conventional reversing switches 75 and 76 are suitably mounted within the plenum 26 adjacent opposite ends of reciprocatory movement of the suction head 44, see FIG. 5, and are engageable by respective tripping pins 77 and 78 to reverse the direction of rotation of the motor 74 at opposite liimts of said reciprocatory movement of the suction head 44. As shown, the tripping pins 77 and 78, as well as the rollers 60, are carried by brackets 79 at the laterally opposite ends of the suction head 44.

During operation of the grain dryer 1, flow of dust laden air from the dryer 1 passes through the several filter elements 25, the screens 40 filtering out foreign matter from the air, so that filtered air flows outwardly through the louver sections 18. During operation of the grain dryer 1, the separator motor 50 and the motor 74 are energized to respectively create negative air pressure within the suction head 44 and impart vertical traveling movement to the suction head 44. As the dust laden air impinges on the several screens 40, pressure of the air deflects or bows the screens forwardly into engagement with the partition elements 33 and 34. The air separator fan driven by the separator motor 50 creates a negative pressure in the suction head 40 that is substantially greater per square inch than the pressure of drying air against the screens 40. Assuming that the opening 31, defined by any given one of the filter frames 25, is forty-eight inches square, its respective screen 40 is under such tension across the opening 31 that a reverse stream of air directed therethrough at a pressure of substantially .018 pound per square inch will deflect or bow the screen away from the partition elements 33 and 34 and from its neutral plane a maximum distance of substantially one-half of an inch. Preferably, the rollers 60 and guide rails 61 position the suction head 44 so that the mouth 54 thereof is rearwardly spaced from the neutral plane of the screens 40 a distance less than the one-half inch maximum or, for the purpose of the present example, substantially one-quarter of an inch. Thus, as the suction head 40 is raised and lowered in the plenum 26, the portions of the screens 40 adjacent the mouth or inlet passage 54 are drawn or flexed inwardly into frictional engagement with the suction head 40 as shown in FIGS. 3 and 4, so that the accumulated dust or other foreign matter trapped in the screens 40 will be effectively dislodged therefrom and drawn into the suction head 44 and from thence to the separator 45.

It will be appreciated that the upward and downward reciprocatory movements of the suction head 44 is quite slow and continuous throughout the grain drying period so that the screens are continuously cleaned during the dust collecting operation thereof. The material removed from the screens 40 and desposited in the separator 45 is disposed of in the usual manner, by suitable means, not shown, but connected to the dust valves 53. As the suction head 44 moves upwardly and downwardly with the plenum 26, the blade-like portion 56 wedges the adjacent portions of the closure strips 58 apart progressively between the upper and lower ends thereof, the closure strips 58 returning into sealing engagement immediately above and below the blade-like portion 56, as shown in FIG. 6, due to negative pressure within the tube 46 and normal bias of the closure strips 58 toward each other.

In the event that either of the motors 50 or 74 becomes accidentally deenergized during the grain drying operation, and the filter screens 40 become unduly clogged with collected material, a resultant predetermined rise in air pressure within the plenum 26 causes the damper or valve 15 to open, thereby to relieve pressure within the plenum 26.

What is claimed is:
1. In a dust collector and filter therefor:
(a) vertically elongated housing means defining a plenum having opposed imperforate side walls, a front wall, and a rear wall defining an inlet opening for dust-laden air;
(b) a plurality of like filter elements disposed in superposed relationship to provide the front wall of said plenum and through which air flows outwardly from said plenum, each of said filter elements comprising;
(1) a generally rectangular rigid frame defining an opening for passage of air horizontally therethrough and having an inner flat vertical mounting surface normal to and surrounding said opening,
(2) a normally flat vertically disposed flexible porous screen of woven non-metallic fibers secured to the frame and covering said opening, the screen being disposed substantially in the plane of said inner mounting surface of said frame,
(3) and a plurality of spaced rigid horizontal and vertical partition elements mounted in said frame and dividing said opening into a plurality of air passages, said partition elements each having an edge coplanar with said mounting surface;
(c) the screens of said filter elements being disposed in a common vertical plane;
(d) means for removably anchoring said screens in said superposed relationship;
(e) said front wall including vertically spaced forwardly and downwardly sloping louver elements forwardly of said filter elements;
(f) and filter cleaning means comprising;
(1) a suction head defining a horizontally elongated air inlet opening having a length at least as great as the transverse dimension of one of said filter element openings,
(2) means mounting and guiding said suction head in said plenum for vertical movements adjacent said filter elements in succession and disposing said air inlet opening in closely spaced parallel relation to the common plane of said screens,
(3) a fan in said housing means,
(4) a vertically extended rigid tube in said plenum connected to said fan and defining a longitudinal slot,
(5) a slot closure including a pair of elongated flexible closure strips secured to the tube adjacent a different side of said longitudinal slot, said strips having outer longitudinal side edge portions normally disposed in face-to-face engagement outwardly of the slot,
(6) and a vertically elongated conduit element connected to the suction head and movable therewith longitudinally in said slot, said conduit element engaging said strips to separate engaged portions thereof to establish communication between the suction head and said tube in all positions of the suction head in said plenum;
(g) and power operated mechanism in said housing means for imparting vertical movements to said suction head in said plenum.

2. The dust collector and filter therefor according to claim 1 in which said power operated mechanism includes a motor, sprocket wheels journalled at the upper and lower ends of said plenum, means connecting one of said sprocket wheels to said motor, and a drive and support chain entrained over said sprocket wheels and secured to said suction head.

3. The dust collector and filter therefor according to claim 1, characterized by a dust separator in said housing means having an inlet connected to said rigid tube, a clean air outlet communicating with said plenum, and means for discharging particles of foreign material separated from the air in said separator.

References Cited

UNITED STATES PATENTS

| | | | |
|---|---|---|---|
| 1,206,103 | 11/1916 | Goethel | 55—483X |
| 2,247,472 | 7/1941 | Bible | 55—294 |
| 2,316,526 | 4/1943 | McDonald | 160—104X |
| 2,594,957 | 4/1952 | Martens | 55—294 |
| 2,970,351 | 2/1961 | Rice | 98—115(VM)X |
| 3,018,503 | 1/1962 | Hijiya et al. | 15—312 |
| 3,147,098 | 9/1964 | Honan et al. | 55—294 |
| 3,222,850 | 12/1965 | Hart | 55—501X |
| 3,233,391 | 2/1966 | Olsen | 55—294X |
| 3,303,636 | 2/1967 | Liel | 55—294 |
| 3,306,012 | 2/1967 | Wallin | 55—294 |
| 3,377,780 | 4/1968 | Noland | 55—294 |

DENNIS E. TALBERT, JR., Primary Examiner

U.S. Cl. X.R.

55—293, 294, 302, 413, 423, 431, 432, 459, 466, 483, 501, 511; 137—580